(12) United States Patent
Jinzaki

(10) Patent No.: US 7,415,561 B2
(45) Date of Patent: Aug. 19, 2008

(54) COMPUTER FOR DYNAMICALLY DETERMINING INTERRUPT DELAY

(75) Inventor: Akira Jinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 300 days.

(21) Appl. No.: 10/880,584

(22) Filed: Jul. 1, 2004

(65) Prior Publication Data
US 2004/0236875 A1     Nov. 25, 2004

Related U.S. Application Data

(63) Continuation of application No. PCT/JP02/00516, filed on Jan. 24, 2002.

(51) Int. Cl.
*G06F 13/24* (2006.01)
(52) U.S. Cl. ...................... 710/267; 710/263
(58) Field of Classification Search ................ 710/260, 710/262, 263, 266, 267, 48
See application file for complete search history.

(56) References Cited

U.S. PATENT DOCUMENTS

| | | | | |
|---|---|---|---|---|
| 5,555,420 | A * | 9/1996 | Sarangdhar et al. | 710/266 |
| 5,613,129 | A * | 3/1997 | Walsh | 710/267 |
| 5,708,814 | A | 1/1998 | Short et al. | |
| 5,708,817 | A * | 1/1998 | Ng et al. | 710/266 |
| 5,881,296 | A | 3/1999 | Williams et al. | |
| 6,195,725 | B1 | 2/2001 | Luhmann | |
| 6,370,607 | B1 * | 4/2002 | Williams et al. | 710/262 |

FOREIGN PATENT DOCUMENTS

| | | |
|---|---|---|
| JP | 53-145536 | 12/1978 |
| JP | 2000-322270 | 11/2000 |
| JP | 2001-331329 | 11/2001 |

OTHER PUBLICATIONS

International Preliminary Examination Report for corresponding application PCT/JP2002-000516 filed Jan. 24, 2002.
European Search Report dated Oct. 9, 2006 for a related European Patent Application.
European Search Report dated Jul. 30, 2007 for a related European Patent Application.
Search Report for corresponding European Appln. No. 02716364.1 dated Apr. 6, 2006.
Japanese Patent Office mailed an Office Action on Feb. 26, 2008 for corresponding Japanese Patent Application No. 2003-562797.

* cited by examiner

*Primary Examiner*—Clifford H Knoll
(74) *Attorney, Agent, or Firm*—Staas & Halsey LLP

(57) ABSTRACT

In a computer having a unit for outputting an interrupt request to a processor, a delay condition from occurrence of an interrupt event to issue of an interrupt request to the processor can be dynamically determined depending on the processor load status, etc. The interrupt request output unit includes a unit for obtaining a determination factor of a delay condition from the occurrence of an interrupt event to the issue of an interrupt request to the processor, and a unit for determining a delay condition corresponding to the obtained determination factor. For example, a time up to a read of an interrupt factor by the processor is obtained as a determination factor, and is multiplied by a coefficient, thereby determining a delay time as a delay condition.

18 Claims, 22 Drawing Sheets

COMPUTER FOR DYNAMICALLY DETERMINING INTERRUPT DELAY

CROSS REFERENCE TO RELATED APPLICATION

This application is a continuing application, filed under 35 U.S.C. §111(a), of International Application PCT/JP02/00516, filed Jan. 24, 2002 incorporated by reference herein.

BACKGROUND OF THE INVENTION

1. Field of the Invention

The present invention relates to an interrupt control system, and more specifically to a computer system capable of dynamically determining the delay time, for example, from an external input of an interrupt event to an output of an interrupt request of an interrupt request output unit in a computer system to a processor depending on the load status of the processor.

2. Description of the Related Art

When an interrupt event requiring external interrupt processing by a processor is input to a computer system, for example, an I/O device which receives the interrupt event issues an interrupt (request) signal to the processor, and the processor performs corresponding interrupt processing. For example, when the I/O device is a network interface, an interrupt signal is issued from the I/O device to the processor when communications data such as a packet is received.

FIG. 16 is a block diagram showing the configuration of the computer system to which the present invention is applied. In FIG. 16, the computer system includes a processor 50, main memory 51, an I/O bus bridge 53, and a plurality of I/O devices 54 and 55.

In FIG. 16, the I/O bus bridge 53 connects the processor 50, the main memory 51, and an I/O bus 52, and provides an access function from the processor 50 to the main memory 51 and the I/O bus 52. The I/O devices 54 and 55 are connected to the I/O bus 52, and function as interfaces between various devices such as a network, a disk, etc. and the computer system.

For example, in the case of a network interface, when communications data is received by the I/O device, an interrupt (request) signal is issued to the processor 50, the processor 50 checks inside the I/O device 54, for example, the contents of an interrupt factor register in correspondence with the signal.

In this example, the conventional technology is described by referring to a PCI (peripheral component interconnect) system bus currently used as a major high-speed bus for personal computers, and a PCI bus device, but the present invention can be applied to any similar system.

In the system as shown in FIG. 16, the timing and the frequency of an I/O device issuing an interrupt (request) signal to a processor have considerable influence on the performance of a system. For example, when an I/O device is an interface corresponding to the Gigabit Ethernet, the transfer performance of 125 MB/sec can be realized for transmission/reception, but the minimum length of a packet is approximately 60 bytes. Therefore, if a notification is issued to the processor each time a packet is received, an interrupt is made to the processor every 0.5 μs.

FIG. 17 is an explanatory view of a conventional technology of the interrupt processing performed in the above-mentioned case. In FIG. 17, for example, an interrupt event 1 is externally applied to the computer system, the processor immediately performs interrupt processing, then an interrupt event k is externally applied, and the processor immediately performs interrupt processing.

When the processor performs interrupt processing, a predetermined processing load is required for saving and restoring an current process state, designating a interrupt factor, etc. When interrupts frequently occur, and the interrupt intervals become shorter, the interrupt processing load of a processor increases, thereby possibly reducing the performance of the system.

Thus, to avoid the increase in the load of the processor by frequent occurrence of interrupt, the conventional technology called "interrupt coalescing" is widely used. In the interrupt coalescing, the time from the occurrence of an event requiring an interrupt, that is, an interrupt event, to an issue of an actual interrupt request to the processor is delayed on a predetermined condition. For example, since interrupt events are collectively input, a processing load such as the current process state to be saved and restored, the designation of an interrupt factor, etc. can be collectively processed, thereby reducing the processing load of the processor.

FIG. 18 is an explanatory view of the above-mentioned interrupt coalescing. In FIG. 18, a plurality of interrupts from the interrupt event 1 to the interrupt event K are collected, and an interrupt request is issued from the I/O device to the processor.

As a typical condition up to an interrupt request in the interrupt coalescing, the conditions such as "the passage of a predetermined time", "a predetermined number of occurrences of interrupt events", etc. are applied. For example, in the case of a network interface, an interrupt request is issued if a predetermined time has passed after a packet is received. In this method, when a total of K packets are received while the interrupt is being delayed, the number of interrupts to the processor can be reduced to 1/K. Using the condition of the frequency of interrupt events, the frequency of interrupt events can also be decreased.

Described below is the conventional configuration of the device of the interrupt request circuit in the I/O device. FIG. 19 is a block diagram of the configuration of the device. In FIG. 19, for example, an interrupt request circuit 58 is provided in the I/O device 54, and an interrupt factor register 59 is provided in the interrupt request circuit 58.

The interrupt request circuit 58 issues an interrupt (request) signal to the processor 50 through the I/O bus 52 and the I/O bus bridge 53 when an interrupt event occurs by, for example, externally receiving a packet, and simultaneously the information for determination of the contents of the interrupt event is set in the interrupt factor register 59.

The contents of the interrupt factor register 59 is read from the processor 50 through the I/O bus 52, and can be written. The processor 50 identifies the contents of an interrupt event by checking the contents of the interrupt factor register 59. The processor 50 can notify the interrupt request circuit 58 of the end of the interrupt processing by clearing the contents of the interrupt factor register 59. Corresponding to this notification, the interrupt request circuit 58 negates an interrupt signal, thereby completing the process on the interrupt.

FIG. 20 is an explanatory view of a flow of the interrupt processing shown in FIG. 19. When an interrupt event is applied to the I/O device, an interrupt signal is immediately issued to the processor, and the processor starts in <1> the interrupt processing by checking the interrupt factor with the contents of the interrupt factor register 59, fundamentally terminates the interrupt processing and clears the contents of the interrupt factor register 59, and performs the process of releasing the work area for the interrupt processing, etc. in <2>, and terminates the interrupt processing in <3>.

FIG. 21 is a block diagram of another example of the configuration of the conventional I/O device. FIG. 22 is an explanatory view of the flow of the interrupt processing shown in FIG. 21. In FIG. 21, a condition register 61 storing a predetermined fixed delay condition is provided in the interrupt request circuit 58, and an interrupt delay circuit 62 determines a delay time from the occurrence of an interrupt event to the issue of an interrupt signal to the processor. The storage contents of the condition register 61 can be the above-mentioned predetermined time, or a predetermined frequency of interrupt events, and the interrupt delay circuit 62 determines the delay time from the occurrence of an interrupt event corresponding to the contents, and outputs an interrupt signal.

In FIG. 22, an interrupt signal is issued to the processor if a predetermined delay time has passed after an interrupt event is applied to the I/O device. Then, as in the case as shown in FIG. 20, <1> the interrupt factor is checked, <2> the interrupt factor is cleared, and <3> the interrupt processing is terminated.

There are three problems with the interrupt coalescing as the above-mentioned conventional technology. The first problem is that the response from the occurrence of an interrupt event is constantly delayed because an interrupt is delayed on a constant condition from the occurrence of an interrupt event. For example, in the case of an network interface, and in the case only a packet is received, the interrupt processing cannot be performed until a predetermined time has passed since the packet is actually received.

The second problem is that since the load status of a processor is not considered, an adaptive process cannot be performed by, for example, immediately performing an interrupt when the load of a processor is small, and delaying an interrupt when the load of the processor is large.

The third problem is that although an I/O device is used with a card, etc. inserted, and the optimum condition for the interrupt delay between the card and the processor depends on a card, etc., the conventional technology uses fixed delay conditions without adjustments.

The present invention aims at providing a computer capable of dynamically determining the delay condition from the occurrence of an interrupt event to the issue of an interrupt request signal from an I/O device to a processor depending on the performance and the load status of a processor and the frequency of occurrence of interrupt events.

SUMMARY OF THE INVENTION

FIG. 1 is a block diagram of the configuration showing the principle of the present invention. In FIG. 1, an interrupt request output unit 1 corresponds to the I/O device shown in FIG. 16, and outputs an interrupt request to a processor 2 in response to the occurrence of an interrupt event.

In FIG. 1, the interrupt request output unit 1 includes a delay condition determination device 3. The delay condition determination device 3 dynamically determines a delay condition, for example a delay time, from the occurrence of an interrupt event to the issue of an interrupt request from the interrupt request output unit 1 to the processor 2.

In the embodiment of the present invention, the interrupt request output unit 1 further includes a delay condition determination factor output device 4. The delay condition determination factor output device 4 obtains a determination factor of a delay condition from the occurrence of an interrupt event to the output of an interrupt request to the processor, and the delay condition determination device 3 determines the condition up to the issue of an interrupt request corresponding to the determined factor.

In this case, the interrupt request output unit 1 further includes an interrupt factor storage device for storing an interrupt factor corresponding to the occurrence of an interrupt event, and the delay condition determination factor output device 4 can either obtain the time from the issue of an interrupt request to the read of the storage contents of the interrupt factor storage device by the processor as a delay condition determination factor corresponding to the subsequent interrupts, or obtain the time from the issue of an interrupt request to the clear of the storage contents of the interrupt factor storage device by the processor as the delay condition determination factor corresponding to the subsequent interrupts.

In an embodiment of the present invention, the delay condition determination factor output device 4 measures a plurality of times the time from the issue of an interrupt request to the read of the storage contents of the interrupt factor storage device by the processor, or the time to the clear of the storage contents, and obtains the delay condition factor for the subsequent interrupts based on the measurement values obtained in the plurality of measurements.

In a further embodiment of the present invention, the delay condition determination device 3 multiplies the time as a determination factor obtained by the delay condition determination factor output device 4 by a predetermined coefficient, thereby determining the delay time as a delay condition.

Additionally, the computer according to the present invention includes an interrupt period setting device and an interrupt point determination device. The interrupt period setting device sets a period in which an interrupt request is issued to the processor 2 in correspondence with an interrupt event generated by the interrupt request output unit 1, and the interrupt point determination device determines the time in which an interrupt request is output corresponding to the interrupt event based on the set interrupt period.

In an embodiment of the present invention, the interrupt request output unit 1 further includes an interrupt factor storage device for storing an interrupt factor corresponding to an interrupt event which has occurred so that the interrupt period setting device can set the interrupt period based on the time from the issue of an interrupt request to the read of the storage contents of the interrupt factor storage device by the processor, or to the clear of the storage contents of the interrupt factor storage device.

According to an embodiment of the present invention, the interrupt period setting device can also set the interrupt period in response to an instruction from the processor 2.

The computer according to the present invention includes the unit 1 for outputting the interrupt request for the processor 2, the interrupt request output unit 1 includes a delay condition storage device, for example, a condition register, for storing a delay condition, dynamically determined by the processor, from the occurrence of an interrupt event to the issue of an interrupt request to the processor.

The program according to the present invention is used by a computer having an unit for outputting an interrupt request for a processor in performing the procedure of dynamically determining the delay condition from the occurrence of an interrupt event to the issue of an interrupt request by the interrupt request output unit to the processor, and the procedure of storing the determined delay condition in the register of the interrupt request output unit.

The program according to the present invention is used by a computer having an unit for outputting an interrupt request for a processor in performing the procedure of activating a timer when the interrupt request output unit outputs the interrupt request to a processor, the procedure of stopping the timer when the processor reads the interrupt factor corresponding to the interrupt request or when the processor clears the interrupt factor, and reading the operation time of the timer, and the procedure of determining the delay time from the occurrence of the subsequent interrupt events to the output of an interrupt request by the interrupt request output unit based on the read time.

As described above, according to the present invention, the delay condition can be dynamically determined from the occurrence of an interrupt event to the issue of an interrupt request by the interrupt request output unit to the processor.

DETAILED DESCRIPTION OF THE PREFERRED EMBODIMENTS

Figure 1:
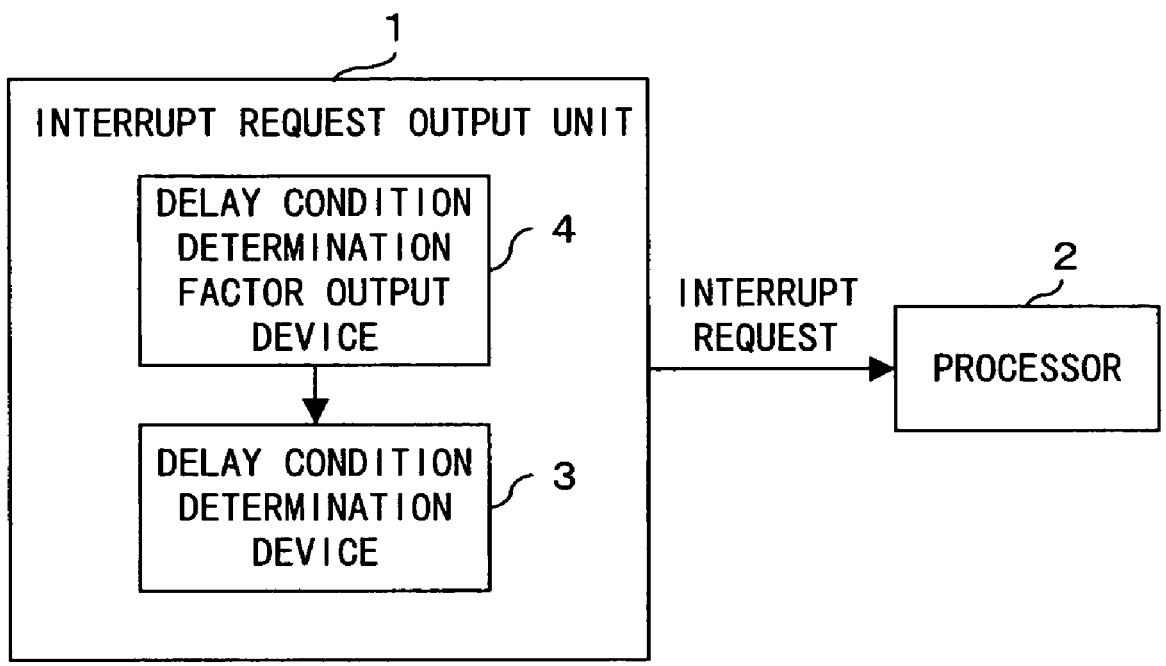
FIG. 1 is a block diagram of the configuration showing the principle of the present invention.
Figure 2:
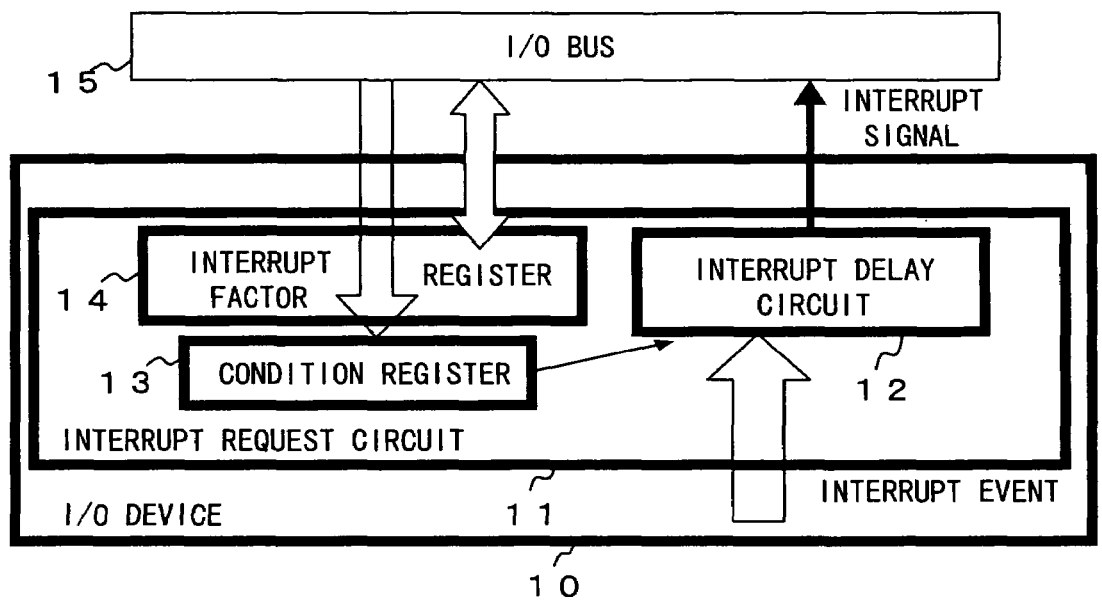
FIG. 2 is a block diagram of the configuration of the interrupt request circuit according to the first embodiment of the present invention.
Figure 3:
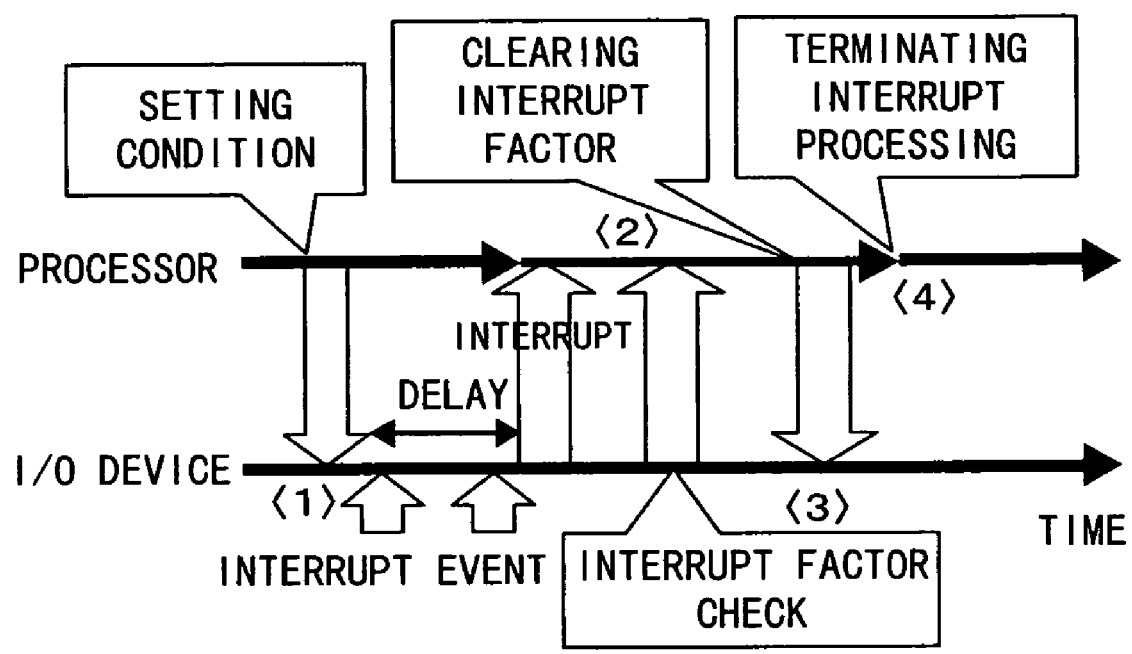
FIG. 3 shows the flow of the interrupt processing shown in FIG. 2.

FIG. 2 is a block diagram showing the configuration of the interrupt request circuit according to the first embodiment of the present invention. And FIG. 3 shows the flow of the interrupt processing shown in FIG. 2.

Figure 21:
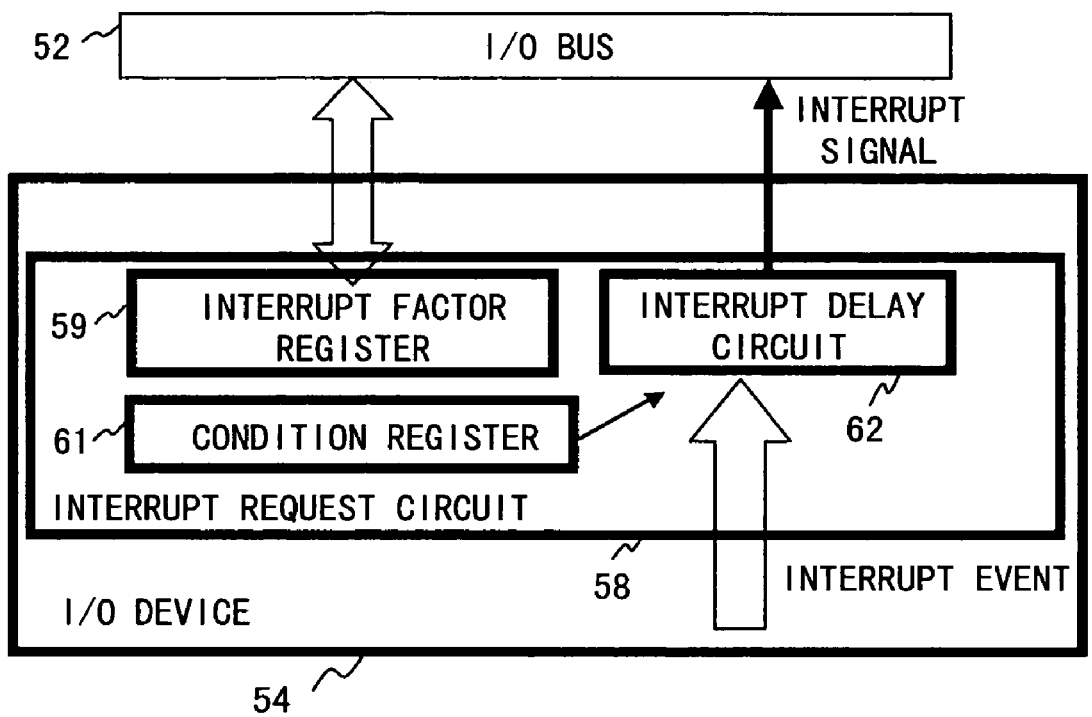
FIG. 21 is a block diagram of the configuration of the conventional technology of the interrupt request circuit when there is an interrupt delay.
Figure 22:
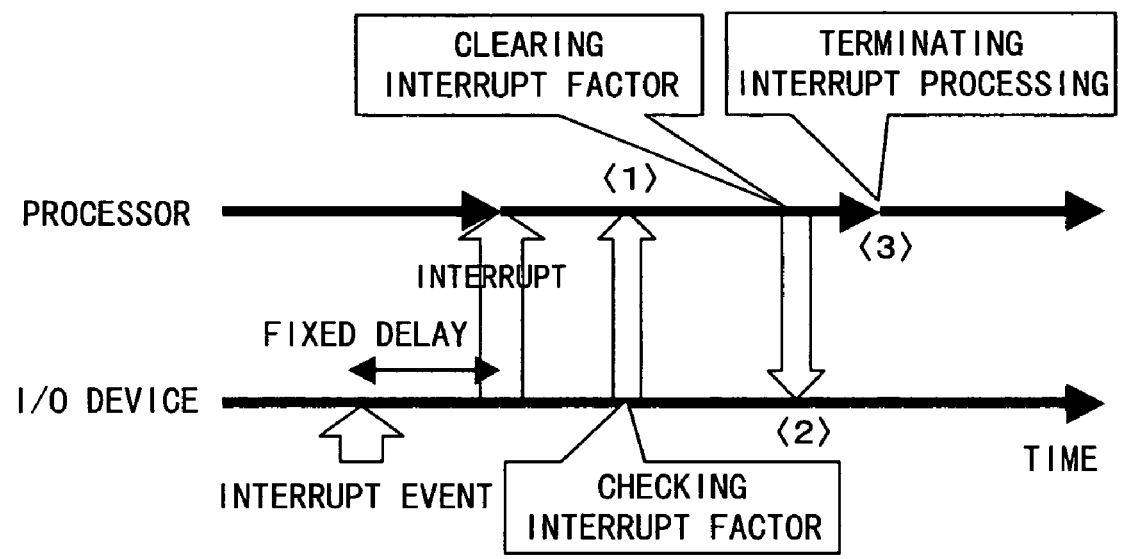
FIG. 22 shows the flow of the process shown in FIG. 21.

In FIG. 2, a condition register 13 stores the delay condition from the occurrence of an interrupt event to the issue of an interrupt (request) signal by an interrupt delay circuit 12 in an I/O device 10 to a processor through an I/O bus 15 as with the condition register 61 described by referring to the conventional technology shown in FIG. 21. The delay condition is dynamically determined by the processor depending on the load status of the processor, and the condition is stored in the condition register 13.

That is, the processor explicitly notifies an I/O device 11 of the interrupt delay condition, that is, the delay time from the occurrence of an interrupt event to the issue of an interrupt signal by the interrupt delay circuit 12, or the number of interrupt events occurring during the period, and the I/O device 11 delays the interrupt based on the condition.

The determination of an interrupt delay condition by the processor is dynamically performed depending on the load status of the processor at each time, etc. For example, the interrupt delay adaptive to the load status of the processor can be dynamically realized by rewriting the contents of the condition register 13 at predetermined time intervals. The method of measuring the load status at the processor side can be any well known technology, and the detailed explanation is omitted here.

In the process flow shown in FIG. 3, <1> the interrupt delay condition on the condition register 13 is set from the processor side, and at the I/O device side, the interrupt delay circuit 12 outputs an interrupt signal to the processor after a delay of the specified time after the occurrence of the first interrupt event based on the specification of the condition, for example, the delay time although a plurality of interrupt events occur during the delay time. The processor reads the contents of the interrupt factor register 14 to check the interrupt factor in <2>, and when the interrupt processing basically terminates in <3>, the interrupt factor stored in the interrupt factor register 14 is cleared, and in <4> completes the interrupt processing.

Figure 4:
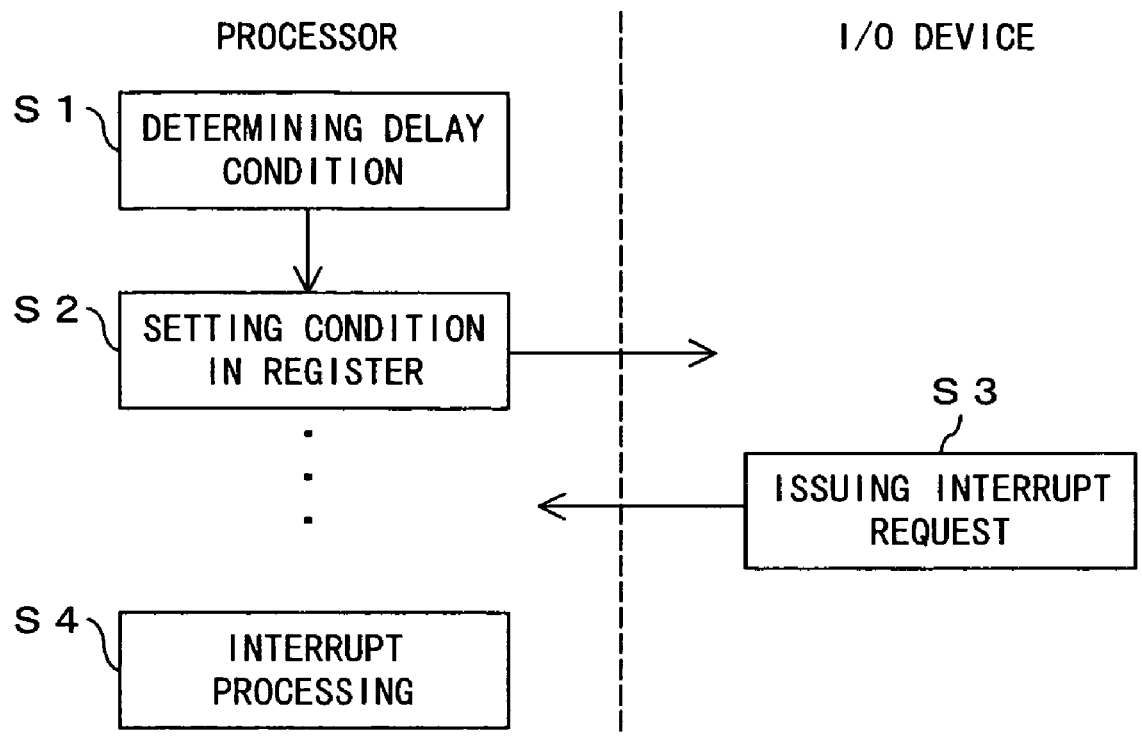
FIG. 4 is a flowchart of the delay condition setting process by the processor according to the first embodiment of the present invention.

FIG. 4 is a flowchart of the interrupt delay condition setting process performed by the processor according to the first embodiment of the present invention. In FIG. 4, the processor first dynamically determines the interrupt delay condition in step S1, and sets the delay condition for the condition register 13 in the I/O device 11. Thus, after the occurrence of an interrupt event, the I/O device 11 outputs an interrupt request signal corresponding to the set interrupt delay condition in step S3, and the processor performs the interrupt processing in step S4.

Figure 5:
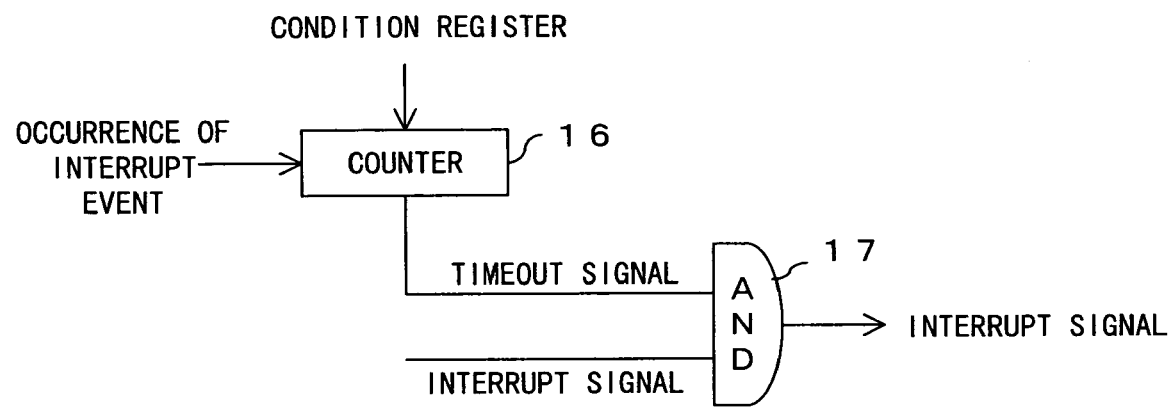
FIG. 5 is a block diagram of the configuration of the interrupt delay circuit according to the first embodiment of the present invention.

FIG. 5 is a block diagram showing an example of the configuration of the interrupt delay circuit 12 according to the first embodiment of the present invention. In this example, an interrupt delay time is set as an interrupt delay condition in the condition register 13.

In FIG. 5, a value of the interrupt delay time set in the condition register 13 is provided for a counter 16 in correspondence with occurrence of an interrupt event, and for example, the countdown is started in the counter. Upon a time-out, a timeout signal is issued to one input terminal of an AND gate 17. An interrupt (request) signal corresponding to the occurrence of the interrupt event is input to the other input terminal of the AND gate 17, and an interrupt (request) signal is output from the AND gate 17 to the processor through the I/O bus 15.

Figure 6:
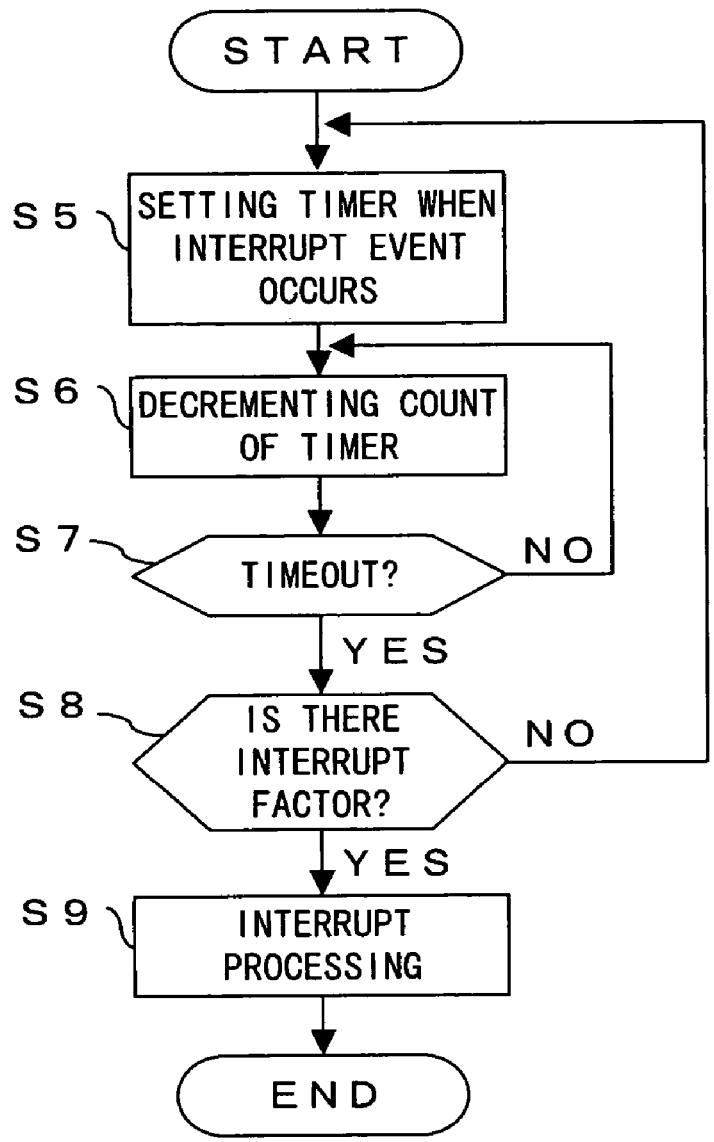
FIG. 6 is a flowchart of the interrupt delay process according to the first embodiment of the present invention.

FIG. 6 shows an example of a flowchart of the interrupt delay process when the interrupt delay circuit 12 is realized by software. In FIG. 6, the value of an interrupt delay time set in the condition register 13 is set in the timer in step S5 when an interrupt event occurs. In step S6, the timer value is decremented, and it is determined in step S7 whether or not a timeout has occurred. If not, the processes in and after step S6 are repeated. If a timeout has occurred, it is determined in step S8 whether or not there is an interrupt factor. If not, the process in and after step S5 are repeated. If there is an interrupt factor, the interrupt processing is performed in step S9.

Figure 7:
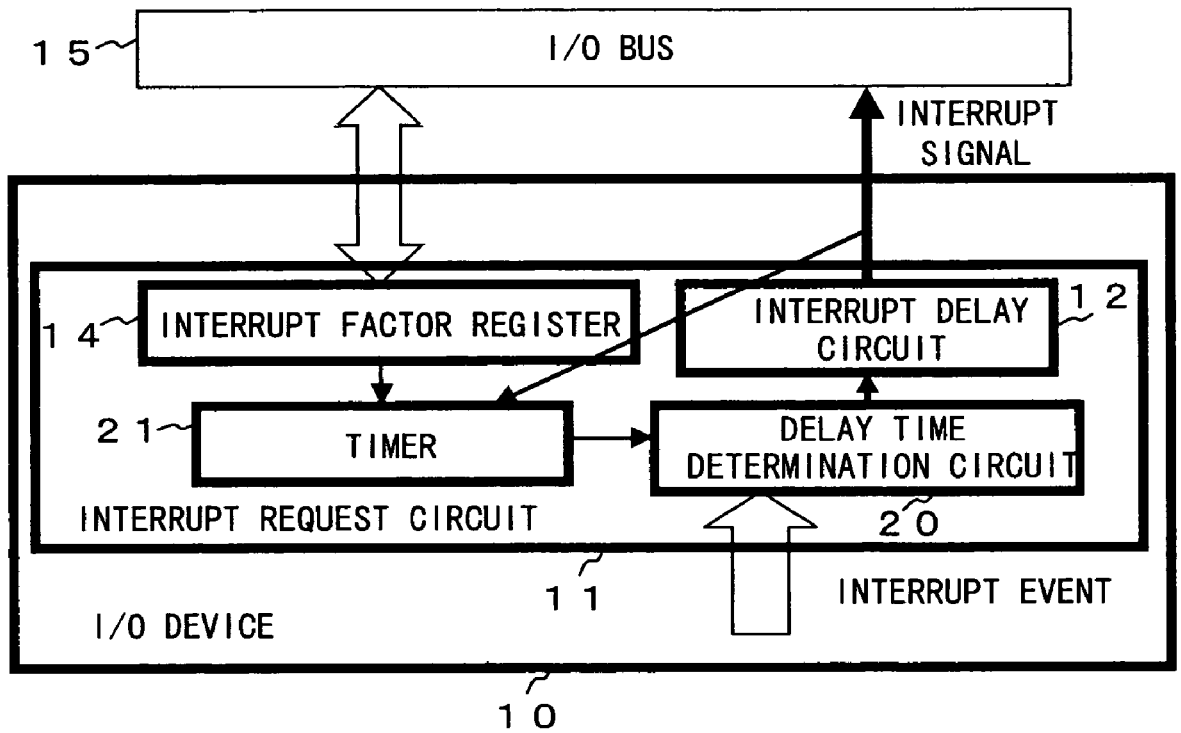
FIG. 7 is a block diagram of the configuration of the interrupt request circuit according to the second embodiment of the present invention.
Figure 8:
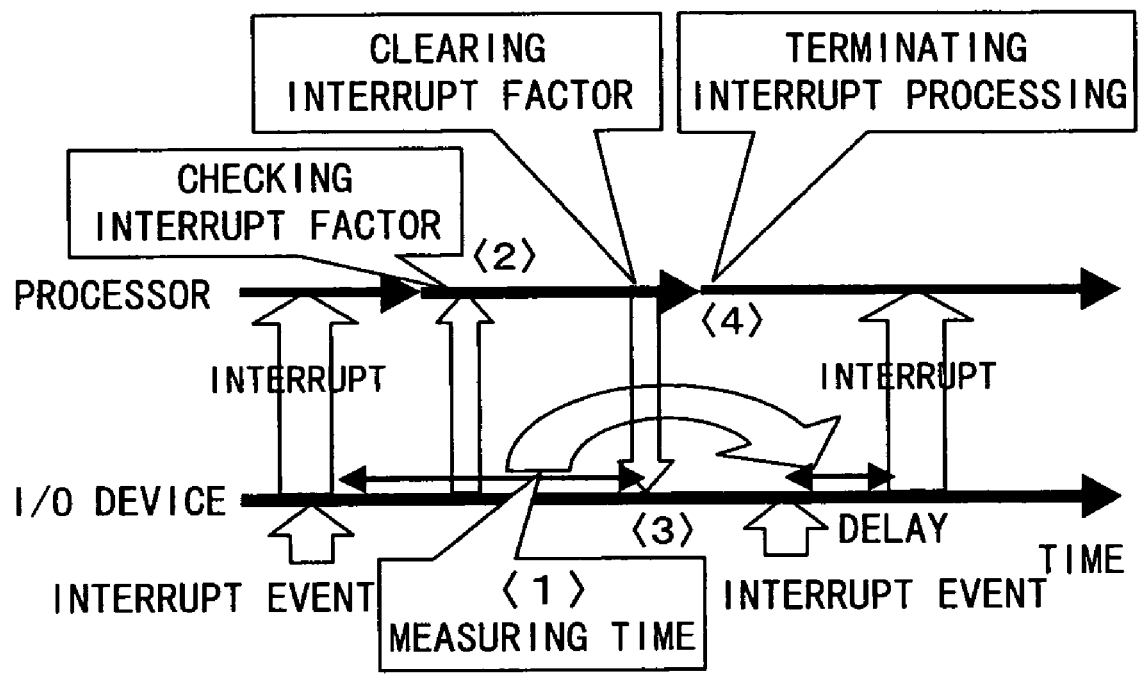
FIG. 8 shows the flow of the interrupt processing shown in FIG. 7.

FIG. 7 is a block diagram of the configuration of the interrupt request circuit according to the second embodiment of the present invention. FIG. 8 shows the flow of the process in FIG. 7. In the second embodiment, unlike the first embodiment, the interrupt delay condition, for example, an interrupt delay time, is dynamically determined by the I/O device.

As described above, the interrupt factor register 14 in the interrupt request circuit 11 stores a factor corresponding to an interrupt event which has occurred. The processor checks an interrupt factor by reading the contents through the I/O bus 15, and clears the interrupt factor when the interrupt processing basically terminates.

In the second embodiment, the load status of a processor is estimated by measuring the time from the output of an interrupt signal for an interrupt event which has occurred at a point in time to the clear of the interrupt factor stored in the interrupt factor register 14, and the interrupt delay time for the interrupt event which next occurs is determined based on the estimated time.

In FIG. 7, the interrupt factor is stored in the interrupt factor register 14 when the interrupt signal is output immediately after an interrupt event occurs, and simultaneously the timer 21 is activated, and the time until the contents of the interrupt factor register 14 are cleared by the processor is measured. Then, the time is provided for a delay time determination circuit 20 for use in determining the interrupt delay time corresponding to the occurrence of the next interrupt event.

In determining the delay time, the measurement value of the timer 21 can be used as is, but the measurement value can be multiplied by a coefficient, for example, 2, 4, . . . , ½, ¼, . . . , etc. to determine the delay time. As an empirical fact, the entire performance can be improved by multiplying a measurement value of a timer by, for example, 4 than by using the measurement value as is in some systems.

In the process flow shown in FIG. 8, when an interrupt event occurs at a point in time, for example, the I/O device immediately outputs an interrupt signal to the processor through the I/O bus 15, and starts measuring time in <1>. The processor checks in <2> the interrupt factor stored in the interrupt factor register 14, and clears the interrupt factor when the interrupt processing basically terminates in <3>. On the I/O device side, the measurement value of the time from the output of the interrupt signal to the clear of the interrupt factor in <3> is used in determining the interrupt delay time corresponding to the occurrence of the next interrupt event. That is, an interrupt signal is output by delay of the determined delay time from the occurrence of the next interrupt event, and the time is measured again for the occurrence of the further interrupt event.

Figure 9:
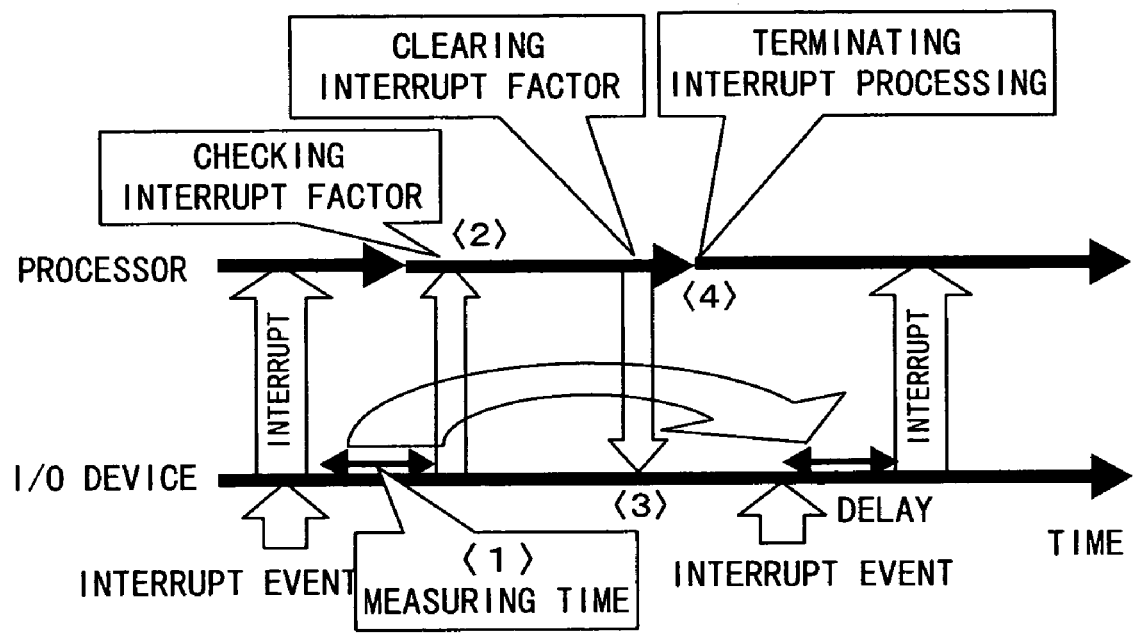
FIG. 9 shows the flow of the process performed when a delay time is determined based on the time up to reading an interrupt factor according to the second embodiment of the present invention.

FIG. 9 is an explanatory view of the process flow performed when the timer 21 measures the time from the output of the interrupt signal to an interrupt factor check, not to the clear of the interrupt factor by the processor, and the interrupt delay time for the next interrupt is determined based on the time according to the second embodiment.

In FIG. 9, as in FIG. 8, when an interrupt event occurs, an interrupt signal is immediately output to the processor, and in <1> the timer 21 starts time measurement. On the processor side, the contents of the interrupt factor register 14 are checked in <2>, the factor is cleared in <3>, and in <4> the interrupt processing is terminated. However, the time measurement in <1> continues up to the time of the interrupt factor check, and the measurement result is used in determining the interrupt delay time corresponding to the next interrupt event.

That is, in FIG. 9, the time measured by the timer 21 reflects the time from the reception of an interrupt (request) signal to the actual start of the interrupt processing by the processor, and the time also corresponds to the load status of the processor.

Thus, according to the second embodiment, the processor does not specify the interrupt delay condition, but the I/O device practically detects the processing load status of the processor, and determines the interrupt delay condition. That is, the I/O device measures the time from the issue of the interrupt request to the processor to the start or the end of the corresponding interrupt processing by the processor, and determines the interrupt delay condition based on the time. In this embodiment, it is not necessary for the processor to set the delay condition.

Figure 10:
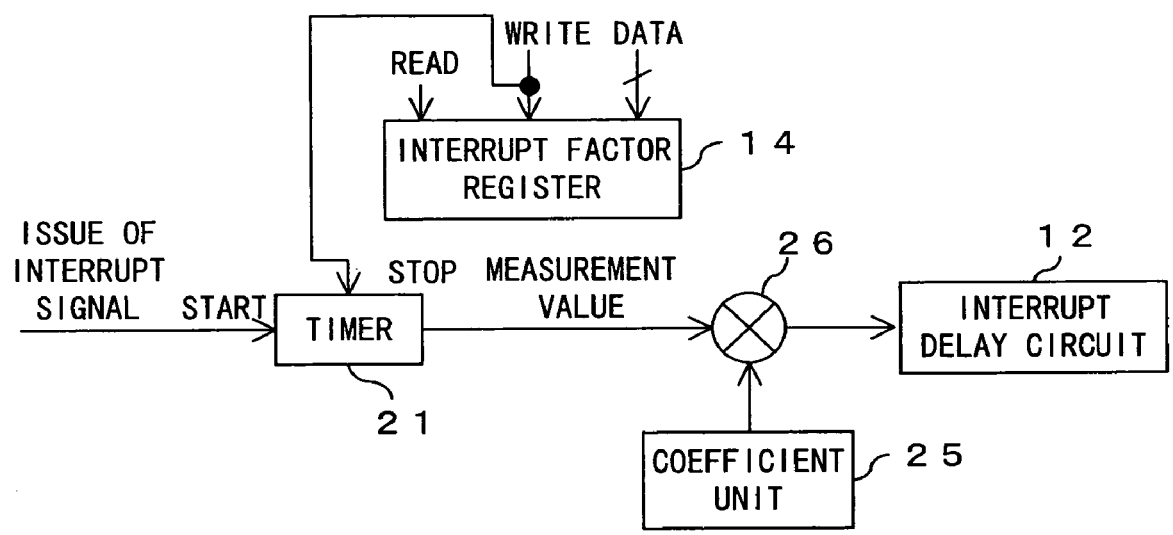
FIG. 10 is a block diagram of the configurations of a timer and a delay time determination circuit according to the second embodiment of the present invention.

FIG. 10 is a block diagram of the detailed configuration of the timer and the delay time determination circuit shown in FIG. 7 according to the second embodiment. In FIG. 10, an interrupt event occurs, the interrupt factor register 14 stores an interrupt factor, and an interrupt signal is output from the interrupt delay circuit 12 to the processor. And then the timer 21 is activated and counting is started.

In FIG. 8, when the processor clears the contents of the interrupt factor register 14, for example, when 0 is written as data, a stop signal is input to the timer 21 corresponding to the write signal of the data, and the timer 21 outputs a measurement value to a multiplier 26. The coefficient unit 25 outputs to the multiplier 26 a coefficient by which the measurement value of the timer is to be multiplied, and the multiplication result by the multiplier 26 is provided for the interrupt delay circuit 12. The configuration of the interrupt delay circuit is the same as that of the first embodiment shown in FIG. 5.

In FIG. 9, the time after the timer 21 starts counting until the processor reads the contents of the interrupt factor register 14, that is, outputs a read signal, is measured. Partially unlike FIG. 10, a stop signal is issued to the timer 21 when the read signal is input. The measurement value of the timer is provided for the multiplier 26 as described above, is multiplied by the coefficient output by the coefficient unit 25, and output to the interrupt delay circuit 12.

Figure 11:
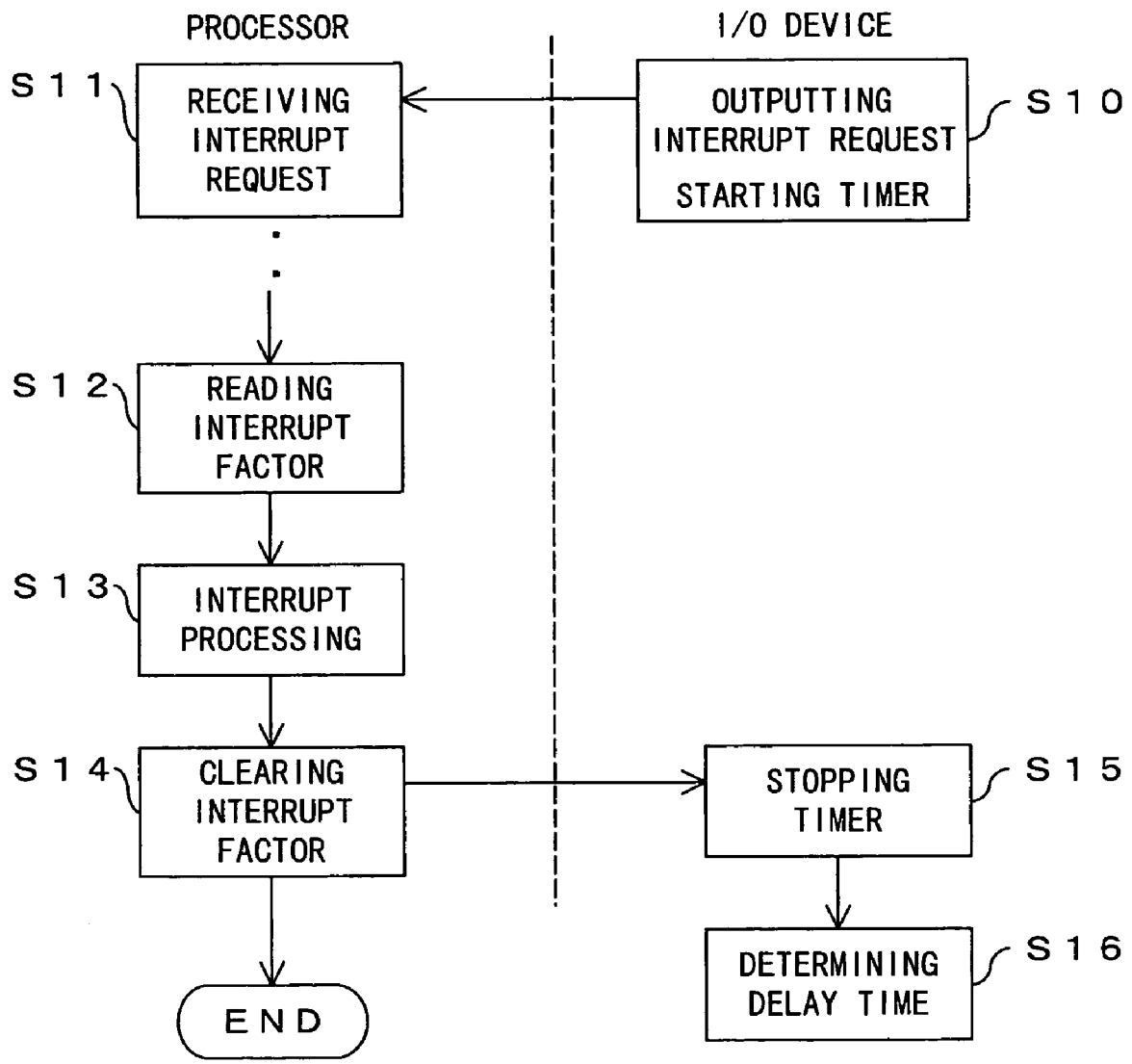
FIG. 11 shows the first example of a flowchart of the interrupt delay time determining process according to the second embodiment of the present invention.

FIG. 11 is a flowchart of the interrupt delay time determining process shown in FIG. 8. In FIG. 11, the I/O device outputs an interrupt request signal to the processor, and the timer 21 shown in FIG. 7 is activated in step S10.

The processor receives the interrupt request in step S11, and reads the contents of the interrupt factor register 14 in step S12 after a time depending on the load process status at the time of the interrupt request received has passed. Then, the processor performs the interrupt processing in step S13, and clears the contents of the interrupt factor register in step S14.

The I/O device detects the clear of the interrupt factor register by the processor, stops the timer in step S15, and determines the delay time based on the value of the timer in step S16.

Figure 12:
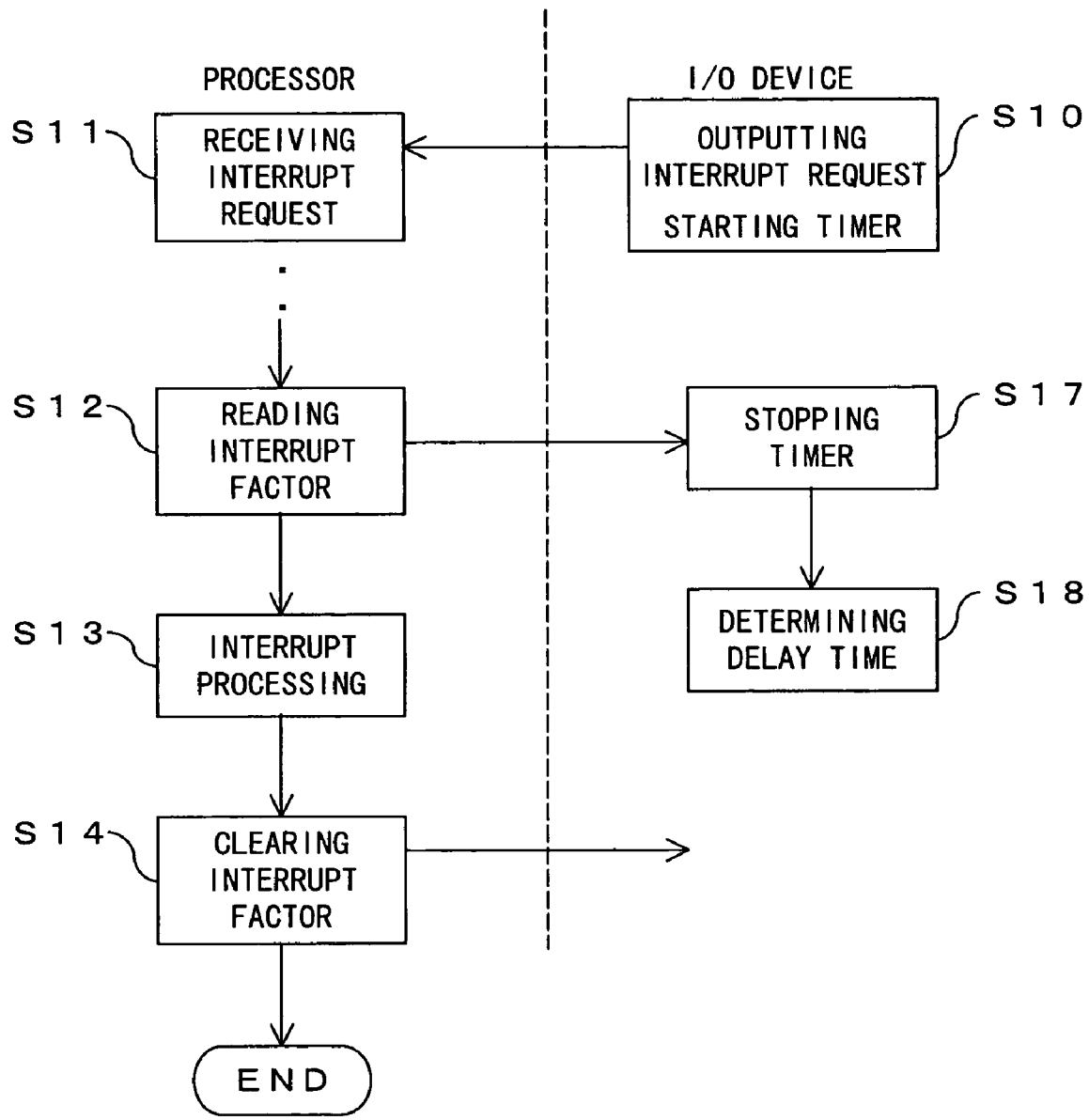
FIG. 12 shows the second example of a flowchart of the interrupt delay time determining process according to the second embodiment of the present invention.

FIG. 12 is a flowchart of the delay time determining process shown in FIG. 9. As compared with FIG. 11, the difference is that the I/O device stops the timer in step S17 corresponding to the process in step S12 by the processor, that is, the process of reading the interrupt factor, and determines the interrupt delay time in step S18.

Figure 13:
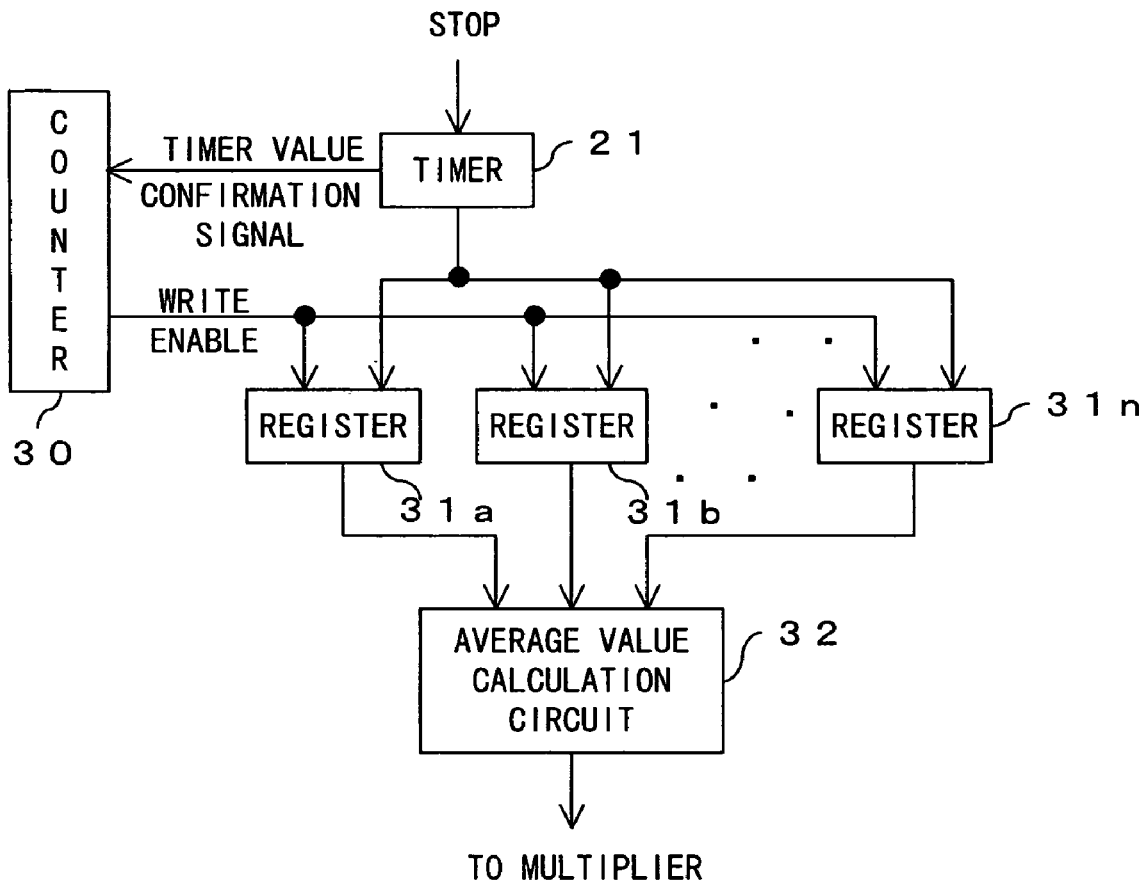
FIG. 13 is a block diagram of an example of the configuration of the delay time determination circuit for determining the delay time from a plurality of time measurement values according to the second embodiment of the present invention.

FIG. 13 is a block diagram showing an example of the configuration of the delay time determination circuit for measuring a plurality of times the time from the output of an interrupt signal to the read or the clear of the contents of the interrupt factor register 14 by the processor, and setting the interrupt delay condition corresponding to the next interrupt based on the plural measurement results according to the second embodiment.

In FIG. 13, as in FIG. 10, a stop signal is output to the timer 21 when the processor clears or reads the contents of the interrupt factor register 14. The timer 21 first counts the time from the output of the interrupt signal corresponding to the occurrence of the first interrupt event, and the measurement value is stored in a register 31a. The store of the measurement value is made such as the timer 21 provides a timer value confirmation signal for a counter 30, the count value of the counter 30 is incremented in correspondence with the signal, and the output of the counter 30 is provided as a write enable signal for the register 31a.

The time from the output of the interrupt signal corresponding to the occurrence of the second interrupt event to the read or the clear of the contents of the interrupt factor register 14 by the processor is measured by the timer 21, and the count value is stored in a register 31b by providing the write enable signal output by the counter 30 for the register 31b.

Similarly, a total of n count values are stored in the respective registers, and then the count values are provided for an average value calculation circuit 32, and a calculated average value is output to the multiplier 26 shown in FIG. 10, thereby obtaining the measurement value corresponding to interrupt events of plural times for use in determining an interrupt delay time corresponding to the occurrence of the next interrupt event.

Figure 14:
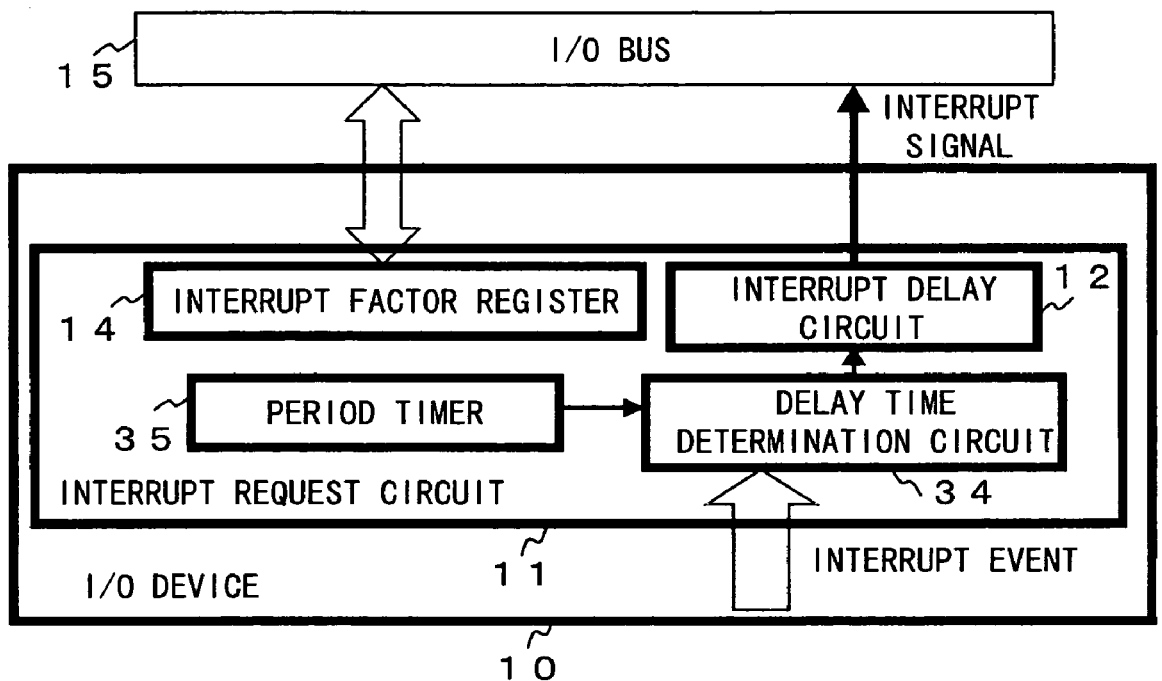
FIG. 14 is a block diagram of the configuration of the interrupt request circuit according to the third embodiment of the present invention.
Figure 15:
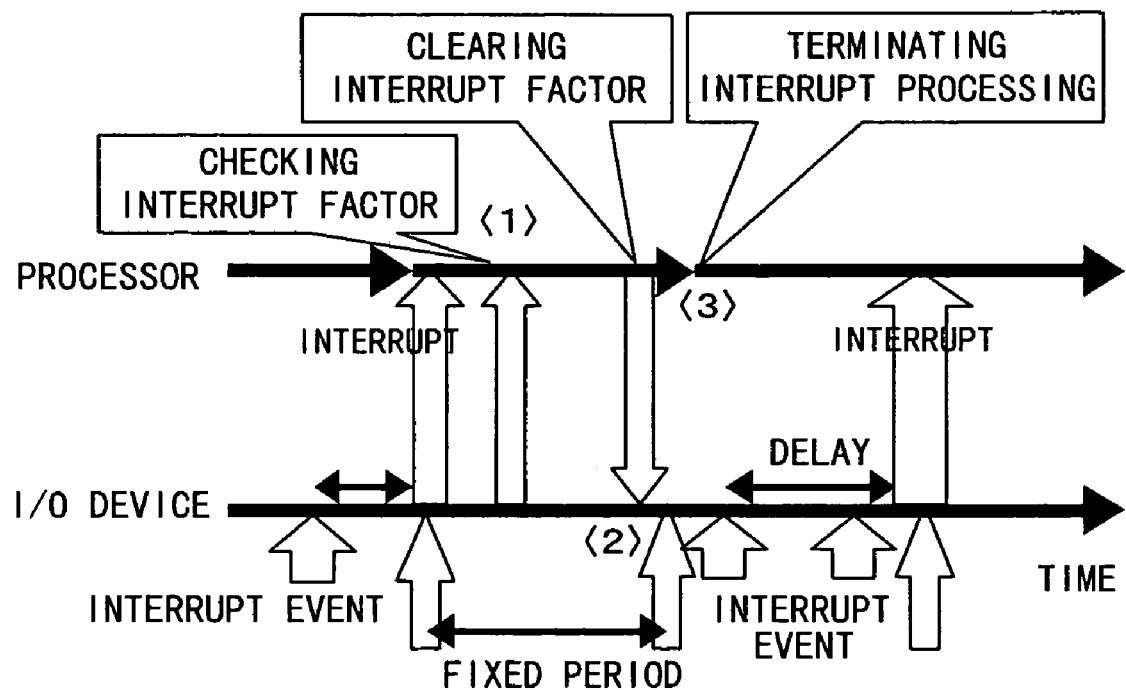
FIG. 15 shows the flow of the process shown in FIG. 14.
Figure 16:
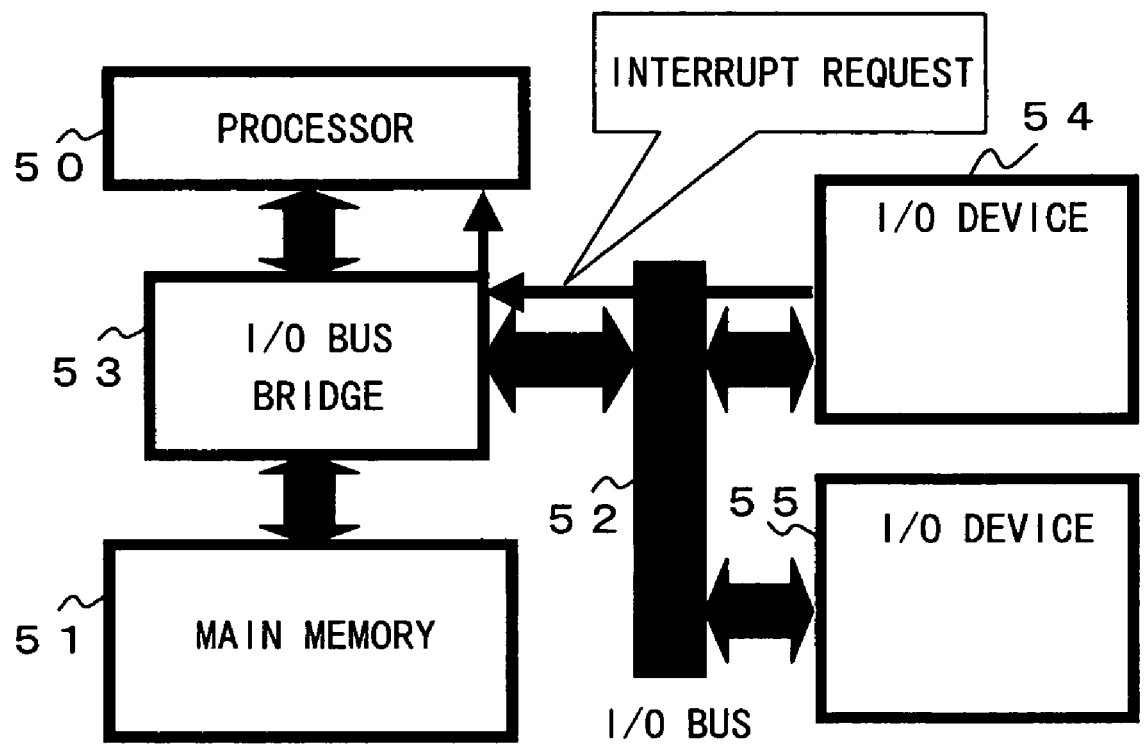
FIG. 16 is a block diagram of an example of the configuration of the computer system.
Figure 17:
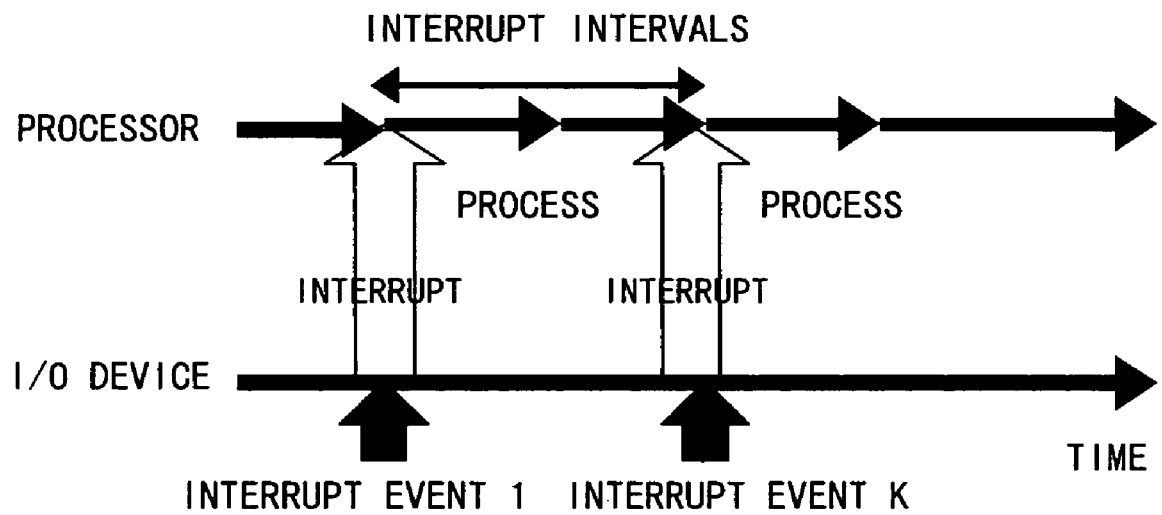
FIG. 17 is an explanatory view showing the relationship between the interrupt intervals and the interrupt processing load.
Figure 18:
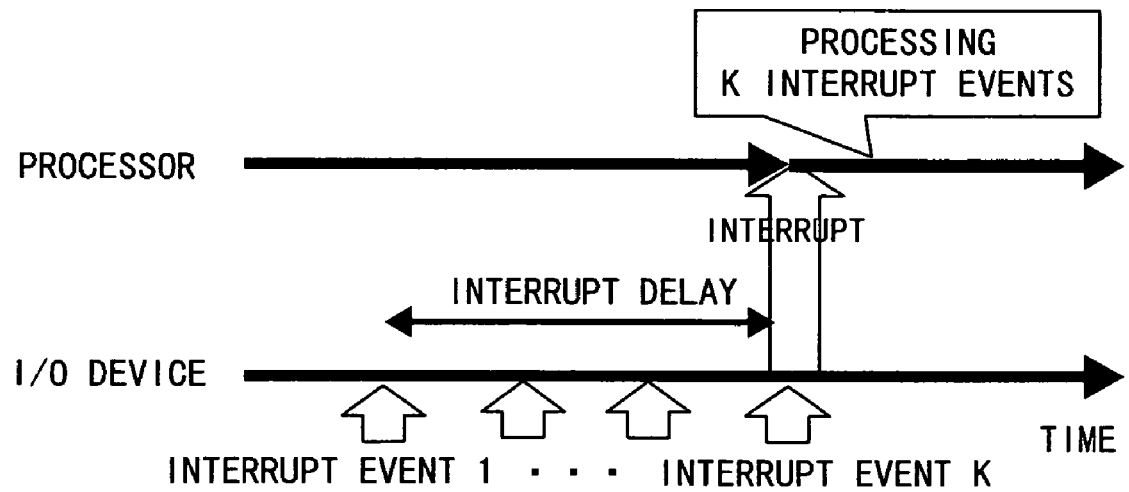
FIG. 18 is an explanatory view of the process of interrupt coalescing as a conventional technology.
Figure 19:
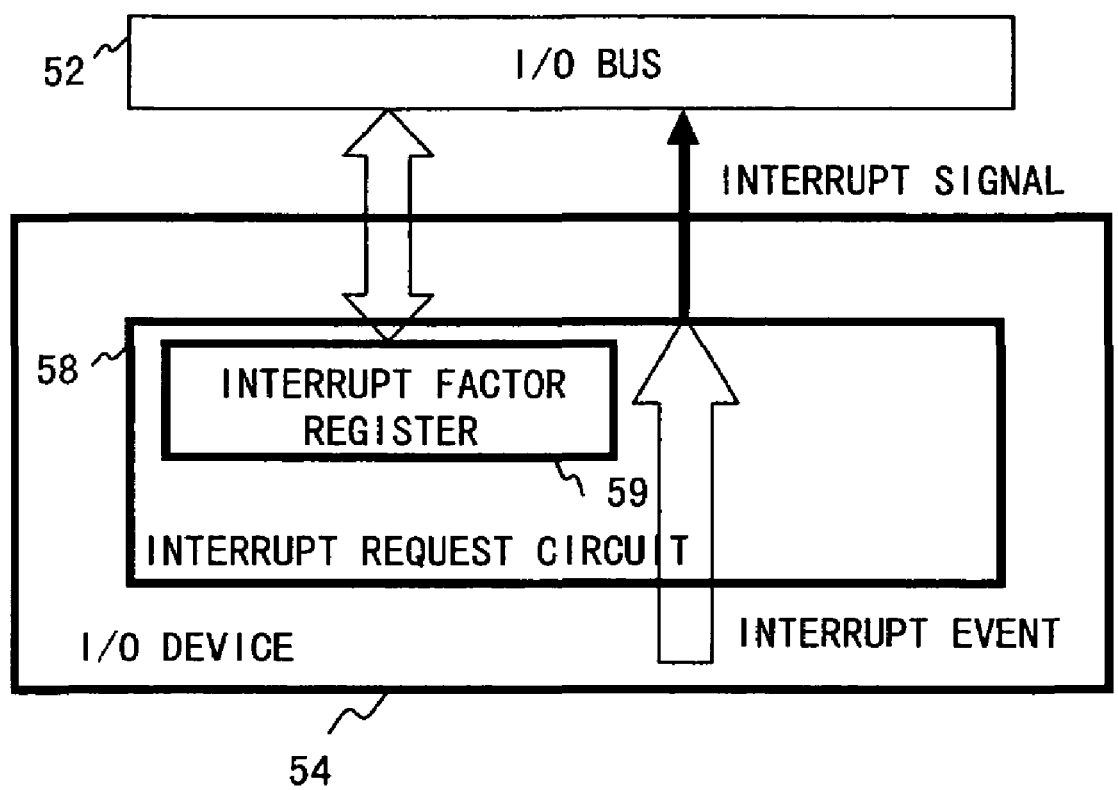
FIG. 19 is a block diagram of the configuration of the conventional technology of the interrupt request circuit when there is no interrupt delay.
Figure 20:
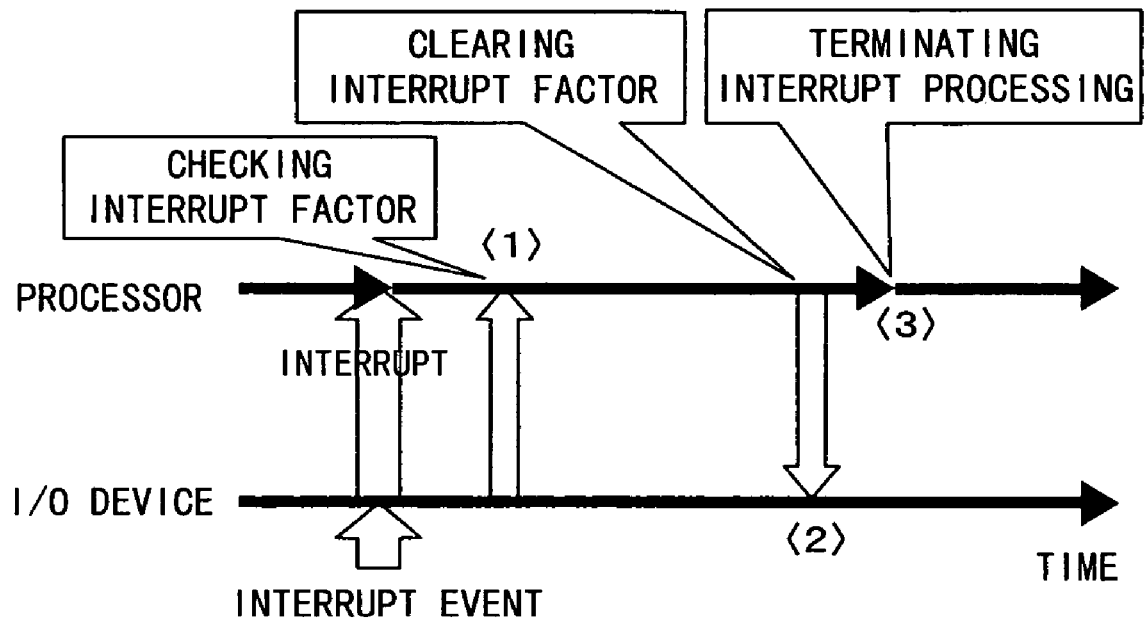
FIG. 20 shows the flow of the process shown in FIG. 19.

FIG. 14 is a block diagram of the configuration of the interrupt request circuit 11 according to the third embodiment of the present invention. FIG. 15 is an explanatory view of the process flow shown in FIG. 14. In the third embodiment, the I/O device 10 periodically outputs an interrupt (request) signal to the processor. Although an interrupt event occurs, an interrupt delay is performed until the timing of the next interrupt period. Since the occurrence of an interrupt event is distributed at random in the period, the delay time from the occurrence of an interrupt event to the actual output of an interrupt signal is a half of the period on an average.

In FIG. 14, a period timer 35 generates the interrupt period, and a delay time determination circuit 34 determines a delay time in synchronization with the period. The interrupt delay circuit 12 outputs an interrupt signal to the processor at a point in time which is in synchronization with the period.

In FIG. 15, the interrupt signal is output for the processor with the timing of the next fixed period corresponding to the occurrence of the first interrupt event, the processor checks an interrupt factor in <1>, clears the interrupt factor in <2>, and terminates the interrupt processing in <3>.

For the next interrupt event occurred, the output of the interrupt signal is delayed until the timing determined depending on the period. Although other interrupt events occur during the period, the interrupt (request) signals for the interrupt events are collectively output.

The period in which the period timer 35 is generated can be three points in time, that is, when the period is fixed, when the period is specified by the processor depending on the load status as in the first embodiment, and when the period is determined based on the measurement value obtained by the I/O device of the time to the read or the clear of the contents of the interrupt factor register 14 by the processor as in the second embodiment.

As empirical facts, the system of issuing an interrupt request with a periodical timing as in the third embodiment is effective in a system using the TCP/IP (transmission control protocol/Internet protocol), and the system of multiplying a measurement value of a timer by a coefficient as explained above by referring to FIG. 7 according to the second embodiment is effective in the system using the UDP/IP (user datagram protocol/Internet protocol).

In the above-mentioned explanation, the embodiments are described using a delay time as an interrupt delay condition, but the frequency of occurrence of interrupt events can be used as a delay condition. For example, in the second embodiment, instead of measuring the time up to the processor reading or clearing the interrupt factor, the number of interrupt events occurring during the period can be counted, and the delay condition can be determined based on the number.

As described above in detail, according to the present invention, the processing load status of the processor can be determined from the past process status corresponding to an interrupt event, and the interrupt delay condition can be adaptively set corresponding to the determination result.

As a result, when the load of a processor is low, an interrupt can be performed immediately after the occurrence of an interrupt event. When the load of the processor is high, an interrupt can be delayed depending on the level of the load. Thus, the delay time from the occurrence of an interrupt event to the output of an interrupt request can be automatically optimized.

Furthermore, although a card, etc. is inserted into an I/O device, the optimum condition for the interrupt delay between the card and the processor can be automatically adjusted, thereby greatly contributing to the improvement of the performance in the interrupt processing.

With the computer according to the present invention, the delay condition from the occurrence of an interrupt event to the issue or an interrupt request to a processor can be adaptively determined depending on the load of a processor, etc. Therefore, the present invention can be applied in all industries in which computers capable of performing interrupt processing are used.

What is claimed is:

1. A computer having a unit for outputting an interrupt request to a processor for dynamically determining an interrupt delay, wherein:

said interrupt request output unit comprises a delay condition storage device, the delay condition storage device is configured to store a delay condition relating to a period from an occurrence of an interrupt event to an issue of an interrupt request to the processor;

the delay condition is dynamically determined by the processor based on frequency of the interrupt event, representing a load status of the processor; and the delay condition storage device issues an interrupt request to the processor, based on the load status of the processor.

2. A computer having a unit for outputting an interrupt request to a processor for dynamically determining an interrupt delay, wherein:
said interrupt request output unit comprises a delay condition determination device;
the delay condition determination device dynamically determines a delay condition, based on frequency of an interrupt event;
the delay condition relates to a period from an occurrence of the interrupt event to an issue of an interrupt request; and
the interrupt request is issued and sent to the processor, based on a load status of the processor.

3. The computer according to claim 2, wherein:
said interrupt request output unit further comprising a delay condition determination factor output device for obtaining a determination factor of a delay condition from occurrence of an interrupt event to issue of an interrupt request to the processor; and
said delay condition determination device determines a delay condition up to the issue of the interrupt request corresponding to the delay condition determination factor.

4. The computer according to claim 3, wherein:
said interrupt request output unit further comprises an interrupt factor storage device for storing an interrupt factor corresponding to the interrupt event which has occurred; and
said delay condition determination factor output device obtains a time from the issue of the interrupt request to a read of storage contents of said interrupt factor storage device by the processor as a delay condition determination factor corresponding to subsequent interrupts.

5. The computer according to claim 4, wherein
said delay condition determination factor output device measures a plurality of times a time from the issue of the interrupt request to the read of the storage contents of said interrupt factor storage device by the processor, and obtains a delay condition determination factor corresponding to subsequent interrupts based on the values measured a plurality of times.

6. The computer according to claim 3, wherein:
said interrupt request output unit further comprises an interrupt factor storage device for storing an interrupt factor corresponding to the interrupt event which has occurred; and
said delay condition determination factor output device obtains a time from the issue of the interrupt request to clear of storage contents of said interrupt factor storage device by the processor as a delay condition determination factor corresponding to subsequent interrupts.

7. The computer according to claim 6, wherein
said delay condition determination factor output device measures a plurality of times a time from the issue of the interrupt request to the clear of the storage contents of said interrupt factor storage device by the processor, and obtains a delay condition determination factor corresponding to subsequent interrupts based on the values measured a plurality of times.

8. The computer according to claim 4, wherein
said delay condition determination device determines a delay time as a delay condition by multiplying a time as a determination factor obtained by said delay condition determination factor output device by a predetermined coefficient.

9. A computer having a unit for outputting an interrupt request to a processor for dynamically determining an interrupt delay, comprising:
an interrupt period setting device determining a period in which the interrupt request output unit issues an interrupt request to the processor in correspondence with occurrence of an interrupt event; and
an interrupt point determination device determining a point in time at which the interrupt request is issued by using the interrupt event based on the set interrupt period, wherein
the unit is for outputting an interrupt request to a processor for dynamically determining the interrupt delay depending on a load status of the processor, and
the load status of the processor is based on frequency of the interrupt event.

10. The computer according to claim 9, wherein:
said interrupt request output unit further comprises an interrupt factor storage device for storing an interrupt factor corresponding to the interrupt event which has occurred; and
said interrupt period setting device sets the period based on a time from issue of an interrupt request corresponding to the interrupt event which has occurred to a read of storage contents of said interrupt factor storage device by the processor.

11. The computer according to claim 9, wherein:
said interrupt request output unit further comprises an interrupt factor storage device for storing an interrupt factor corresponding to the interrupt event which has occurred; and
said interrupt period setting device sets the period based on a time from issue of an interrupt request corresponding to the interrupt event which has occurred to clear of storage contents of said interrupt factor storage device by the processor.

12. The computer according to claim 9, wherein
said interrupt period setting device sets the period in correspondence with an instruction from the processor.

13. A program used to direct a computer having a unit for outputting an interrupt request to a processor to perform the procedures of:
dynamically determining a delay condition relating to a period from an occurrence of an interrupt event to an issue of an interrupt request from the interrupt request output unit to the processor, based on frequency of an interrupt event and a load status of the processor; and
storing the determined delay condition in a register of the interrupt request output unit.

14. A program used to direct a computer having a unit for outputting an interrupt request to a processor to perform the procedures of:
activating a timer when the interrupt request output unit issues the interrupt request to the processor;
stopping the timer when the processor reads an interrupt factor corresponding to the interrupt request, and reading an operation time of the timer; and
determining based on the read time a delay time from occurrence of subsequent interrupt events to issue of an interrupt request by the interrupt request output unit.

15. A program used to direct a computer having a unit for outputting an interrupt request to a processor to perform the procedures of:

activating a timer when the interrupt request output unit issues the interrupt request to the processor;

stopping the timer when the processor clears an interrupt factor corresponding to the interrupt request, and reading an operation time of the timer; and determining based on the read time a delay time from occurrence of subsequent interrupt events to issue of an interrupt request by the interrupt request output unit.

16. The computer according to claim 5, wherein
said delay condition determination device determines a delay time as a delay condition by multiplying a time as a determination factor obtained by said delay condition determination factor output device by a predetermined coefficient.

17. The computer according to claim 6, wherein
said delay condition determination device determines a delay time as a delay condition by multiplying a time as a determination factor obtained by said delay condition determination factor output device by a predetermined coefficient.

18. The computer according to claim 7, wherein
said delay condition determination device determines a delay time as a delay condition by multiplying a time as a determination factor obtained by said delay condition determination factor output device by a predetermined coefficient.

* * * * *